United States Patent [19]

McRae

[11] 4,325,270
[45] Apr. 20, 1982

[54] TORQUE CONVERTER MECHANISM

[76] Inventor: Edwin C. McRae, Box 922, Cusseta, Ala. 36852

[21] Appl. No.: 96,653

[22] Filed: Nov. 23, 1979

[51] Int. Cl.³ .................... F16H 47/04; F16H 47/08; F16H 57/10
[52] U.S. Cl. .................................. 74/677; 74/688; 74/764
[58] Field of Search ............... 74/688, 677, 674, 687, 74/764, 765; 60/341, 345

[56] References Cited

U.S. PATENT DOCUMENTS

| 2,135,282 | 11/1938 | Fottinger | 74/688 |
| 2,308,547 | 1/1943 | Schneider | 74/732 |
| 2,339,015 | 1/1944 | Jandasek | 74/688 |
| 2,350,810 | 6/1944 | Pentz | 74/677 |
| 2,355,709 | 8/1944 | Dodge | 74/720 |
| 2,373,894 | 4/1945 | Jandasek | 74/677 |
| 2,481,529 | 9/1949 | Norelius | 74/677 |
| 2,519,022 | 8/1950 | Burtnett | 74/688 |
| 2,572,007 | 10/1951 | Burtnett | 74/688 X |
| 2,839,950 | 6/1958 | Russell | 60/345 |
| 2,858,675 | 11/1958 | Schneider | 60/345 |
| 2,890,602 | 6/1959 | Smirl et al. | 74/688 |
| 2,893,265 | 7/1959 | Burtnett | 74/688 X |
| 2,987,942 | 6/1961 | Jania | 74/688 X |
| 3,016,709 | 1/1962 | Lysholm | 74/688 |
| 3,020,781 | 2/1962 | Burtnett | 74/688 |
| 3,238,814 | 3/1966 | Jandasek | 74/677 |
| 3,371,555 | 3/1968 | Tuck et al. | 74/677 |
| 3,528,321 | 9/1970 | Harmon et al. | 74/688 X |
| 3,613,479 | 10/1971 | Borneman | 74/677 X |
| 3,772,939 | 11/1973 | Hause | 74/677 |
| 4,140,029 | 2/1979 | Lee | 74/688 |

Primary Examiner—Leslie Braun

[57] ABSTRACT

This invention relates to improvements in a vehicle torque converter whereby the impeller element of the converter may be coupled or locked up to the turbine element for direct drive, to thereby eliminate the inefficiency inherent in such converters when functioning as fluid couplings. My invention also provides a converter having two ranges of torque amplification, i.e., a normal or conventional range where the stator member is held from reverse rotation and a lower range where greater torque amplification is provided.

4 Claims, 2 Drawing Figures

TORQUE CONVERTER MECHANISM

BACKGROUND AND SUMMARY OF MY INVENTION

Torque converters, when used in automobiles, comprise only part of the power train from the engine to the driving wheels. A transmission also must be provided to obtain forward, neutral, reverse, and a low speed ratio. A kick-down ratio for passing other vehicles also is desirable. A transmission also is needed with my improved converter but the low speed gear ratio can be dispensed with as an equivalent ratio is obtained in my converter. Another important feature is that the impeller of this converter may be effectively locked to the turbine when the converter would otherwise function as a fluid coupling. The ten percent fuel loss inherent in converters when operating as fluid couplings is thereby eliminated for normal and high speed driving; also the oil cooler necessary with the conventional converter may be dispensed with.

BRIEF DESCRIPTION OF THE FIGURES OF THE DRAWINGS

The actual construction employed and the operation of the various parts may be better understood by reference to the accompanying drawings in which:

In both illustrations an overrunning cluth is provided which prevents the stator from rotating forwardly faster than the converter turbine. In FIG. 1 this overrunning clutch is disposed between the stator and a planet gear carrier while in FIG. 2 the overrunning clutch is disposed between the stator and the turbine shaft.

Figure 1:
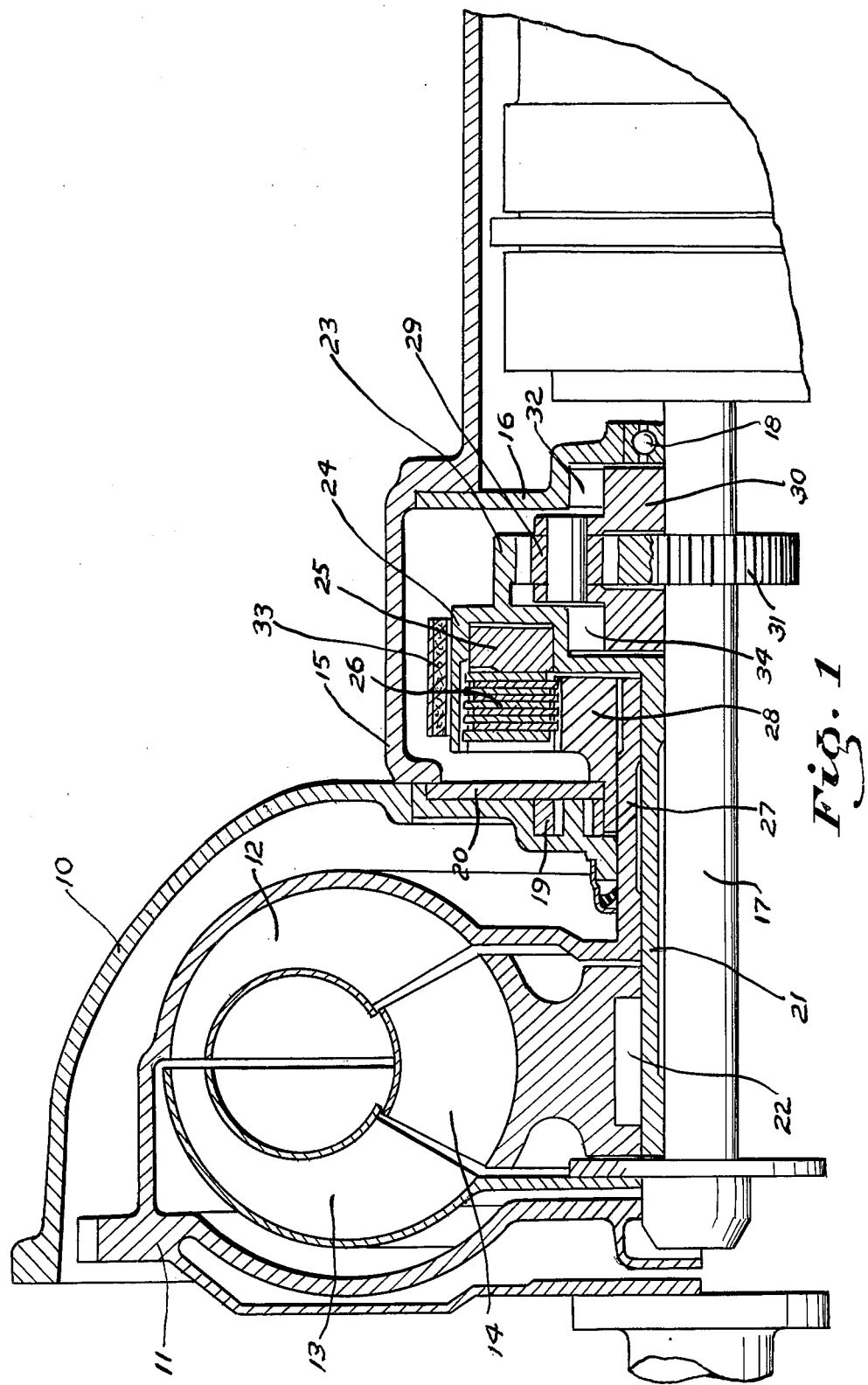
FIG. 1 is a central, sectional view through one form of my converter.

Referring to the drawings, I have used the reference numeral 10 to indicate a torque converter housing which is secured to the flywheel end of a vehicle engine. The housing 10 forms an enclosure for an engine flywheel 11 associated with my improved torque converter. My torque converter comprises a vaned impeller 12, a vaned turbine 13 and a vaned stator 14. These three members are of conventional construction, as my invention is not in the design of these members but in the way in which they are coupled together to give greater utility to the converter. A clutch housing 15 is positioned to the rear of the converter housing 10 and an anchor plate 16, fixed to housing 15, forms a rear bearing support for a turbine shaft 17, the forward end of which is fixed to the turbine 13. The rear portion of the shaft 17 is supported on the plate 16 by a bearing 18. A hydraulic gear pump 19 is mounted on a pump plate 20, which plate forms a partition between the converter housing 10 and the clutch housing 15.

A stator sleeve 21 is rotatably mounted on the turbine shaft 17 and has its forward end connected to the stator 14 through an overrunning clutch 22 in the conventional manner. The overrunning clutch 22 is not essential for the operation of my device, but is desirable as it permits the converter to obtain a fluid coupling condition independently of the control for maintaining the converter in its normal torque amplification range. The rear end of the sleeve 21 is fixed to the hub portion of an internal ring gear 23. The ring gear 23 is thus rotated in a reverse direction when the stator 14 rotates in a reverse direction. A clutch drum 24 is fixed to the ring gear 23, and an annular shaped piston 25 is mounted in a suitable cylinder in the drum 24. A plurality of clutch plates 26 are disposed within the drum 24, each alternate plate being splined to the drum 24. When pressure is applied to the rear face of piston 25 the clutch plates 26 are engaged in the usual manner.

An impeller sleeve 27 is rotatably mounted around the sleeve 21 and has its forward end fixed to the impeller 12. The rear portion of the sleeve 27 extends through the plate 20 where it is fixed to a clutch member 28. The clutch plates 26 which are not splined to the drum 24 are splined to the member 28 to form a piston-operated multiple disc clutch.

A keyed connection is formed between the clutch member 28 and the gear pump 19 so that at all times that the impeller 12 is being driven the pump 19 is operating. When the piston 25 is activated by fluid from the pump 19 the stator sleeve 21 is coupled to the impeller 12 and rotates as a unit with such impeller.

The ring gear 23 forms the outer gear member of a planetary gear set which consists of the ring gear 23, planet pinions 29, planet carrier 30 and a sun gear 31. The sun gear 31 is fixed to the rear portion of the turbine shaft 17 and the carrier 30 rotates upon the shaft 17. When the carrier 30 is held from reverse rotation, reverse rotation of the ring gear 23 will turn the sun gear 31 and turbine 13 forwardly. If the ring gear is twice as large as the sun gear the turbine 13 will be rotated forwardly twice as fast as the ring gear 23 rotates in reverse, provided, of course, that the carrier 30 is held against reverse rotation. An overrunning clutch 32 is positioned between the carrier 30 and plate 16, which clutch prevents reverse rotation of the carrier at all times but which permits forward rotation of the carrier.

From the foregoing it will be apparent that reverse rotation of the stator 14 will mechanically rotate the turbine 13 forwardly at twice stator speed and that forward rotation of the turbine 13 will be ineffectual to cause any mechanical rotation of the stator.

In all converters the impeller by itself can only supply engine torque to the turbine. To obtain any torque multiplication a stator must be employed, and it must be resisted from reverse rotation by a force which always equals the forward hydraulic force supplied to the turbine by the stator. For convenience, I speak of the hydraulic force supplied to the turbine by the stationary stator but, of course, this added torque is in fact due to the acceleration of the hydraulic fluid in a forward direction by the vanes of the stator so that the fluid entering the impeller enters at a faster forward speed than if it entered directly from the outlet ports of the turbine. Consequently, the fluid discharged from the impeller impinges upon the turbine with greater force than if there was no stator member. This increase in the force is applied to the turbine by the impeller but it is caused by the stationary stator and is therefore stated as a hydraulic force applied to the turbine by the stator. It is independent of the hydraulic force applied to the turbine by the rotation of the impeller.

The above-described function of the stator has been dealt with at some length because it is necessary for a clear understanding of my invention to distinguish between the hydraulic force applied to the turbine by the stator and the mechanical force applied to the turbine by the planetary gear set due to the reverse rotation of the stator.

The maximum hydraulic buildup in a converter occurs when both the turbine and stator are held stationary. As the turbine forward speed increases the hydraulic force due to the stationary stator drops off. The torque buildup is, in fact, proportional to the relative speed of the turbine to the stator member. For a given impeller speed the torque buildup on a turbine rotating forwardly at say 200 r.p.m. with the stator stationary is the same as if the turbine was rotating forwardly at 150 r.p.m. and the stator was rotating rearwardly at 50 r.p.m. In this latter instance, however, the horsepower transmitted would be less because of the lower turbine speed. The function of the planetary gear set, above described, is to convert mechanically the reverse rotative force on the stator into a forward mechanical force on the turbine shaft so that even though the turbine is rotating at a reduced speed it is transmitting the same horsepower that it would transmit at a higher speed with a stationary stator.

In my device, so far described, the stator is held from reverse rotation only by the ring gear 23. As the turbine rotates forwardly the stator is permitted to rotate in a reverse direction but only at one-half forward turbine speed. The planet carrier 30, being held from reverse rotation by the overrunning clutch 32, transmits the reverse force on the stator into a forward force on the sun gear 31. Thus the horsepower lost by the lower forward speed of the turbine is mechanically added to the turbine shaft by the sun gear. The effect is that I have provided a low speed range for my converter which has the same overall efficiency as if the stator were held from reverse rotation as in a conventional converter.

In order to obtain normal speed range for my converter I have provided a brake band 33 which is anchored on the clutch housing 15 and which may be operatively engaged with the drum 24 and thus prevent rotation of the stator sleeve 21 in either direction. When the band 33 is engaged, the converter functions in the conventional or normal range.

From the foregoing, it will be seen that in the low speed range, where the stator is permitted to rotate in a reverse direction, the output torque normally delivered by the turbine shaft will be increased mechanically by the reverse torque applied to the stator. This increase in torque is now provided by a low speed gear ratio in the vehicle transmission. My device is believed to be preferable to providing such a low speed gear in the transmission because shifting my device from low range to normal range is accomplished simply by applying the band 33, no synchronization of transmission bands and clutches being necessary.

I will now describe means for locking the impeller to the turbine for normal and high speed driving, at which times the converter would otherwise be operating as a fluid coupling. Referring to FIG. 1 an overrunning clutch 34 is positioned between the ring gear 23 and the carrier 30, which clutch prevents the ring gear 23 from rotating forwardly faster than the carrier 30 rotates forwardly. Thus, when the clutch plates 26 are engaged the ring gear 23 is driven forwardly at engine speed and, as the ring gear cannot rotate forwardly faster than the carrier 30, the carrier 30 also rotates forwardly at engine speed. With the ring gear and carrier rotating forwardly as a unit, the pinions 29 cannot revolve on their axes so that at such time the sun gear is in effect locked by the pinion teeth to rotate as a unit with the carrier, ring gear and impeller. Thus, an effective lockup between the impeller and turbine is obtained. It will be obvious that when the clutch plates 26 are engaged that the brake band 33 must be disengaged.

Figure 2:
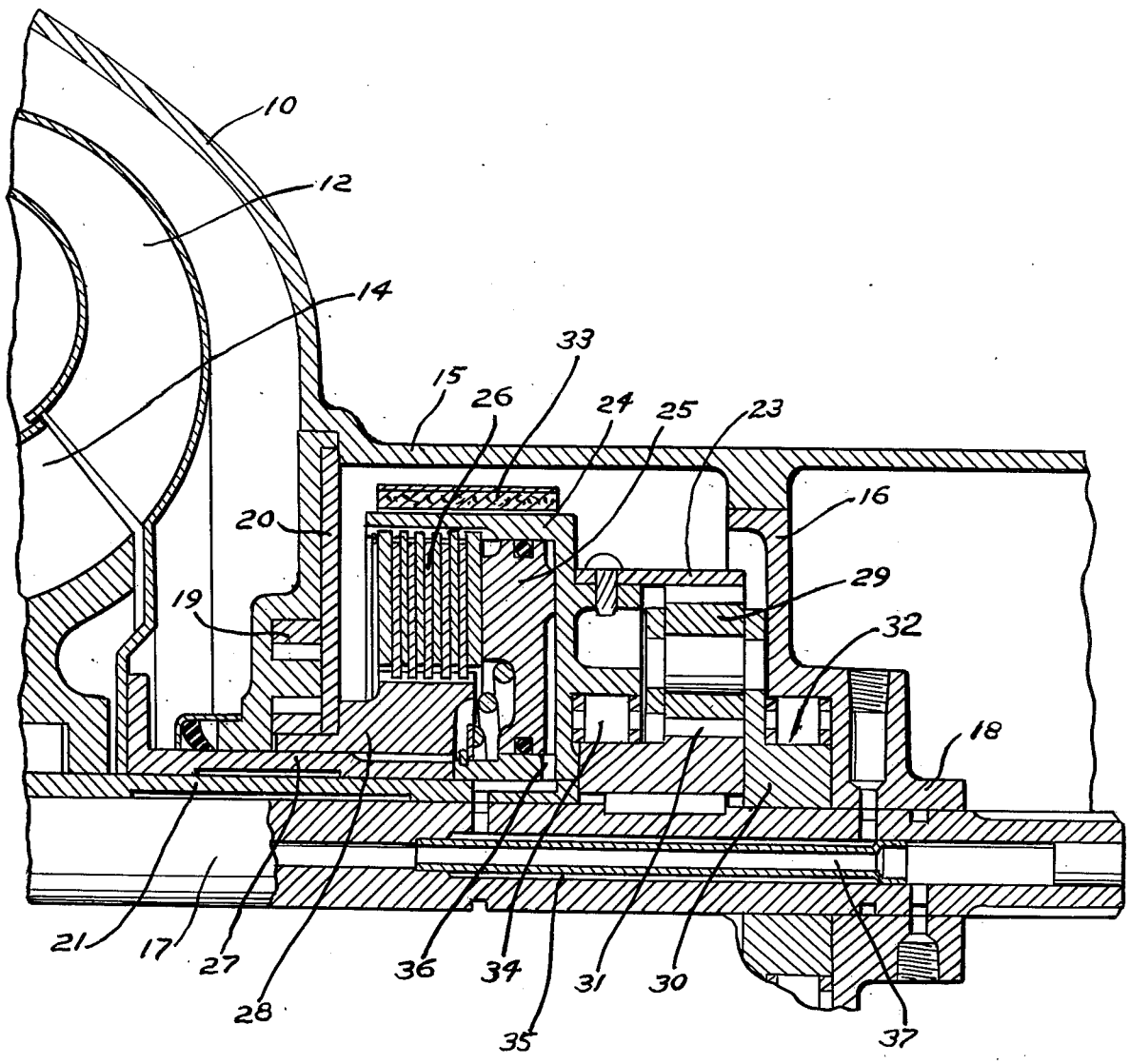
FIG. 2 is a more detailed central, sectional view through an alternate form of my converter and shows in detail the passageways thru which oil is pumped to actuate a multiple disc clutch.

With the construction shown in FIG. 2 the overrunning clutch 34 is positioned between the hub portion of the sun gear 31 and ring gear 23 so that the stator sleeve 21 and ring gear 23 are prevented from rotating forwardly faster than the forwardly rotating speed of the turbine shaft.

Heretofore it has been difficult to provide an operative clutch between the impeller and turbine of a torque converter. The reason for this dilemma is that with the conventional converter the stator is mounted through an overrunning clutch on a stationary sleeve which is connected to the converter housing so as to resist the reverse thrust on the stator to obtain a torque buildup. The impeller is invariably on one side of this stationary sleeve and the turbine is on the other side. Consequently, any direct connection between the impeller and turbine is prevented by the stationary sleeve. It is believed that operatively clutching the impeller to the stator and preventing the stator from rotating forwardly faster than the turbine is new and, if so, is of considerable importance in increasng the fuel economy of vehicles equipped with this converter.

As has been mentioned earlier, a transmission must be used with any converter to complete the power train for an automobile. With my converter the low speed ratio in the transmission may be dispensed with as such low speed ratio is obtained in my torque converter.

With my converter, the vehicle is normally started with the transmission in intermediate gear and the converter in its normal range. When the converter turbine attains a fluid coupling stage it is then locked up. The transmission is then shifted to direct drive for normal and highway operation of the vehicle. If high resistance or uphill starts are encountered, the vehicle is started with the converter in low range and the transmission in intermediate gear. The converter is then shifted to normal range by the application of the band 33 and when the turbine attains a fluid coupling stage it is then locked up to the impeller by engaging the clutch plates 26. The final ratio is obtained by shifting the transmission into direct drive.

I have not shown or described the hydraulic valves or lines that are needed to operate the piston 25 or band 33, as conventional means are adequate to operate these members. It may, however, be well to state that oil under about 125 p.s.i. is provided by the pump 19, which oil is conducted to a piston, not shown, to operate the band 33. As shown in FIG. 2, this oil also is conducted through an axial bore 35 in the shaft 17 and a connecting radial passageway 36 in the hub portion of the ring gear 23 to actuate the piston 25. The oil from the pump 19 also is conducted through a reducing or modulating valve to a second axial bore 37 in the shaft 17 to supply oil under about 25 p.s.i. to the converter's impeller stator and turbine chambers. Oil from the pump 19 also operates the various clutches and bands in the transmission used with the converter.

The numerous valves, lines and controls are just about standard in all automatic torque converters and transmissions. They form no part of this invention and it is believed that illustrating and describing them would unnecessarily complicate this disclosure.

Briefly, the two features of this invention which are believed to be new are: first, the provision of an operable clutch which couples the impeller member to the stator member, together with means for preventing the stator member from overrunning the turbine member in a forward direction to thereby effectively lock the impeller to the turbine for forward rotation. The other feature disclosed in this application is the provision of a torque converter in which the reverse torque applied to the stator member is transmitted mechanically through a planetary gearset to rotate the turbine forwardly independently of the hydraulic force applied to the turbine by the stator member.

While the applicant does not represent that he has exhaustively studied the prior art, of the many patents that he has examined, the following U.S. Patents appear to be the closest references: Nos.

2,135,282
2,147,528
2,308,547
2,232,101
2,339,015
2,350,810
2,355,709
2,373,894
2,481,529
2,519,022
2,572,007
3,528,321
4,140,029

None of these patents is believed to teach my invention.

Some changes may be made in the arrangement, construction and combination of the various parts of my improved torque converter and it is my intention to cover by my claims such changes as may reasonably be included within the scope thereof.

What I claim and desire to secure by U.S. Letters Patent is:

1. In a motor vehical torque converter having impeller and turbine and stator members mounted to define a fluid circuit, a planetary gear set comprising a planet carrier and a sun gear and a ring gear and planet pinions rotatably mounted upon said carrier to mesh with said sun gear and ring gear to form said gear set, a turbine shaft which connects said turbine to said sun gear, a stator sleeve rotatably mounted to rotate in a reverse direction around said turbine shaft connecting said stator to said ring gear, and an overrunning clutch disposed between the converter housing and said carrier which prevents rearward rotation of said carrier, said carrier functioning as a torque re-action member to reverse the rearward torque of said stator into forward torque on said turbine shaft, and said ring gear and sun gear being of such relative sizes that reverse rotation of said stator will drive said turbine shaft forwardly at a substantially greater speed than the reverse speed of said stator, for the purpose described.

2. A device, as claimed in claim 1, wherein an operable clutch connects said impeller with said ring gear and wherein a second overrunning clutch is disposed between said ring gear and said turbine shaft, said second overrunning clutch preventing said ring gear from overrunning said turbine shaft so that when said operable clutch is engaged said impeller will mechanically drive said turbine shaft at a 1 to 1 ratio independently of the fluid circuit of the converter.

3. A device, as claimed in claim 1, wherein an operable brake is disposed between said ring gear and the housing of the converter, which brake when engaged holds said ring gear and said stator against reverse rotation to thereby permit the converter to function as a conventional converter.

4. A device, as claimed in claim 1, wherein an operable clutch connects said impeller with said ring gear and wherein a second overrunning clutch is disposed between said ring gear and said turbine shaft, said second overrunning clutch preventing said ring gear from overrunning said turbine shaft so that when said operable clutch is engaged said impeller will mechanically drive said turbine shaft at a 1 to 1 ratio independently of the fluid circuit of the converter and wherein an operable brake is disposed between said ring gear and the housing of the converter, which brake when engaged holds said ring gear and said stator against reverse rotation to thereby permit the converter to function as a conventional converter.

* * * * *